United States Patent
Calderin et al.

(10) Patent No.: US 9,482,563 B2
(45) Date of Patent: Nov. 1, 2016

(54) REAL TIME MEASUREMENTS OF FLUID VOLUME AND FLOW RATE USING TWO PRESSURE TRANSDUCERS

(75) Inventors: Domingo Calderin, Wappingers Falls, NY (US); Pei-Ying Hsieh, Hillsdale, NJ (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 649 days.

(21) Appl. No.: 13/884,099

(22) PCT Filed: Nov. 9, 2011

(86) PCT No.: PCT/US2011/059898
§ 371 (c)(1),
(2), (4) Date: May 8, 2013

(87) PCT Pub. No.: WO2012/064809
PCT Pub. Date: May 18, 2012

(65) Prior Publication Data
US 2013/0220027 A1 Aug. 29, 2013

Related U.S. Application Data (60) Provisional application No. 61/412,828, filed on Nov. 12, 2010.

(51) Int. Cl.
*G01F 1/34* (2006.01)

(52) U.S. Cl.
CPC ........................................ *G01F 1/34* (2013.01)

(58) Field of Classification Search
CPC ............ G01F 1/34; G01N 2035/1025; G01N 35/1009; G01N 35/1016; B01L 3/021
See application file for complete search history.

(56) References Cited

U.S. PATENT DOCUMENTS

| | | | |
|---|---|---|---|
| 4,296,373 A | 10/1981 | Angel et al. | |
| 5,172,585 A * | 12/1992 | Gleissle | G01N 11/08 73/54.04 |
| 5,503,036 A | 4/1996 | Nguyen et al. | |
| 5,750,881 A | 5/1998 | Dorenkott et al. | |
| 5,939,326 A | 8/1999 | Chupp et al. | |
| 6,158,269 A | 12/2000 | Dorenkott et al. | |
| 6,412,337 B1 * | 7/2002 | Arzate | G01N 11/08 73/54.02 |
| 6,575,019 B1 * | 6/2003 | Larson | G01N 11/08 73/54.04 |

(Continued)

OTHER PUBLICATIONS

International Search Report and Written Opinion for PCT/US2011/059898, dated Mar. 5, 2012 (11 pages).

(Continued)

*Primary Examiner* — Laura Martin
*Assistant Examiner* — Samir M Shah (57) ABSTRACT

To provide accurate determinations of volumetric flow rate and thus of total liquid volume transported over a given time period, two pressure transducers are disposed a predetermined distance apart along a conduit. Precise pressure measurement readings are generated from which volumetric flow rate can be derived with accuracy. Integration of the volumetric flow rate over time yields an improved measure of the total liquid volume that has flowed through the conduit during the respective temporal interval. The two pressure transducers are disposed along the conduit a predetermined distance apart with no obstruction or restriction in the conduit between the transducers. A controller can be used to determine the volumetric flow rate using the Hagen-Poiseuille Equation.

17 Claims, 5 Drawing Sheets

(56) References Cited

U.S. PATENT DOCUMENTS

| | | | |
|---|---|---|---|
| 6,663,353 B2 | 12/2003 | Lipscomb et al. | |
| 6,691,584 B2 * | 2/2004 | Gysling | G01F 1/34 73/861.42 |
| 6,915,679 B2 * | 7/2005 | Chien | B01L 3/502715 422/50 |
| 6,981,960 B2 | 1/2006 | Cho et al. | |
| 6,990,850 B2 * | 1/2006 | Taylor | G01N 11/08 73/54.05 |
| 7,171,315 B2 * | 1/2007 | Loose | G01F 1/3254 702/196 |
| 7,197,942 B2 * | 4/2007 | Gysling | G01F 1/7082 73/24.01 |
| 7,222,526 B2 | 5/2007 | Baker et al. | |
| 7,237,440 B2 * | 7/2007 | Gysling | G01F 1/666 73/861 |
| 7,396,512 B2 | 7/2008 | DiTrolio et al. | |
| 7,418,877 B2 * | 9/2008 | Gysling | G01F 1/36 73/861.42 |
| 7,503,227 B2 * | 3/2009 | Davis | G01F 1/66 73/861.42 |
| 7,556,039 B1 | 7/2009 | Pierry | |
| 7,575,718 B2 * | 8/2009 | Shimizu | B01L 3/0293 422/68.1 |
| 7,587,948 B2 * | 9/2009 | Gysling | G01F 1/708 73/861.42 |
| 7,752,895 B2 * | 7/2010 | Lesieur | G01N 11/08 73/54.09 |
| 7,964,160 B2 * | 6/2011 | Zuppiger | B01L 3/021 422/500 |
| 8,501,099 B2 * | 8/2013 | Viator | G01N 21/1702 422/68.1 |
| 8,900,878 B2 * | 12/2014 | Haack | B01L 3/021 422/501 |
| 2001/0047692 A1 | 12/2001 | Lipscomb et al. | |
| 2002/0194932 A1 | 12/2002 | Gysling et al. | |
| 2006/0112771 A1 | 6/2006 | Mizohata | |
| 2006/0157392 A1 | 7/2006 | Best | |
| 2006/0160074 A1 * | 7/2006 | Dorn | C12Q 1/6888 435/6.11 |
| 2006/0264717 A1 * | 11/2006 | Pesach | A61B 5/0095 600/310 |
| 2008/0019878 A1 * | 1/2008 | Trump | G01N 35/109 422/400 |
| 2008/0127718 A1 | 6/2008 | Lesieur | |
| 2009/0050568 A1 * | 2/2009 | Fogelman | G01N 30/82 210/659 |
| 2009/0170149 A1 * | 7/2009 | Viator | G01N 21/1702 435/29 |
| 2010/0132487 A1 | 6/2010 | Haack et al. | |

OTHER PUBLICATIONS

International Search Report for PCT/US2011/059898, dated May 3, 2012.

\* cited by examiner

REAL TIME MEASUREMENTS OF FLUID VOLUME AND FLOW RATE USING TWO PRESSURE TRANSDUCERS

STATEMENT REGARDING FEDERALLY SPONSORED RESEARCH OR DEVELOPMENT n/a

BACKGROUND OF THE INVENTION

According to Poiseuille's law (also referred to as the Hagen-Poiseuille law), the volume of a homogeneous fluid passing per unit time through a capillary tube is directly proportional to the pressure difference between its ends and to the fourth power of its internal radius (or diameter), and inversely proportional to its length and to the viscosity of the fluid.

Mathematically, Poiseuille's law is represented by:

$$\Delta P = \frac{128 \mu L Q}{\pi d^4}$$

which resolves to:

$$Q = \frac{\Delta P \pi d^4}{128 \mu L}$$

where:
Q is the volumetric flow rate
ΔP is the pressure drop
π is approximately equal to 3.141592654
d is the tube diameter
μ is the dynamic viscosity of the fluid
L is the tube length.

Typically, only one pressure transducer has been employed at a first end of the tube. Atmospheric pressure is assumed to be present at the tube exit. However, in such a case, the pressure differential may not be well-controlled and may lead to inaccurate measurements of volumetric flow rate.

BRIEF SUMMARY OF THE INVENTION

In order to provide more accurate determinations of volumetric flow rate and thus of total liquid volume transported over a given time period, the presently disclosed invention employs two pressure transducers disposed a predetermined distance apart along a conduit. Such an arrangement of transducers provides precise pressure measurement readings from which volumetric flow rate can be derived with greater accuracy. Integration of the volumetric flow rate over time yields an improved measure of the total liquid volume that has flowed through the conduit during the respective temporal interval.

The two pressure transducers may be disposed in the conduit in a variety of configurations depending upon factors such as whether fluid flow through the conduit will be unidirectional or bidirectional. Other components employed in a conduit circuit according to the present disclosure, in addition to the two pressure transducers, include one or more valves for selectively enabling fluid to flow through the conduit, a pump for selectively affecting the movement of fluid through the conduit, a controller for receiving input data from the pressure transducers, for providing selective control over the configuration of the valve(s), and for selectively operating the pump in order to affect movement of fluid within the conduit in one or both directions, and a memory in communication with or integral to the controller for enabling the recording of measured pressure values with time. Other elements that may be associated with such conduit circuits include one or more fluid reservoirs disposed in fluidic communication with a respective end of the conduit, a disposable probe fitted to one end of the conduit, and a probe translation mechanism for enabling the one, two, or three-dimensional translation and placement of the probe. Associated with the controller in one embodiment is a user interface, such as a computer display screen, a printer, etc.

The two pressure transducers are disposed along the conduit a predetermined distance apart. Preferably, there is no obstruction or restriction in the conduit between the transducers. The radius or diameter of the conduit is consistent between the two pressure transducers and is known. The dynamic viscosity of the fluid to be transported through the conduit is also known in advance. Using these factors along with the measured pressure differential between the two transducers, the controller can be used to determine the volumetric flow rate. The Poiseuille law, also known as the Hagen-Poiseuille Equation, can be utilized to make this determination. By measuring the pressure at each transducer, identifying the pressure differential versus time over a given temporal interval, and calculating the volumetric flow rate from the pressure differential, it then becomes possible to calculate, by the controller, the integral of the volumetric flow rate over time to achieve an accurate measure of the total volume of the fluid that flowed through the conduit over the temporal interval.

The design of the conduit circuit in general, and the displacement of the two pressure transducers along the conduit in particular, is an important aspect in the optimization of the measurement sensitivity of the circuit. The resistance to flow in a conduit segment is linearly proportional to the length of the conduit segment. Thus, as the separation between two pressure transducers along a conduit segment increases, so does the resistance to fluid flow and, thus, so too does the difference in pressure between the two transducer measurements. The relative sensitivity of the system increases as the pressure differential increases. However, as the absolute pressure to be measured by either transducer increases, so must the pressure rating of the transducer; transducers with higher pressure ratings may have inferior sensitivity. Consequently, an optimization analysis must be performed in order to find the ideal trade-off between pressure transducer separation and the sensitivity of each transducer.

BRIEF DESCRIPTION OF THE SEVERAL VIEWS OF THE DRAWINGS

Other features and advantages of the present invention will be apparent from the following detailed description of the invention, taken in conjunction with the accompanying drawings of which.

DETAILED DESCRIPTION OF THE INVENTION

Disclosed is an apparatus and method for real-time measurement of fluid volume and flow rate using two pressure transducers in an in vitro analyzer. Various configurations of hardware and method steps are contemplated by the disclosed concept. Improved measurement sensitivity results from the use of such apparatuses and methods.

In general, the disclosed concept pertains to a fluidic circuit (and method of use thereof) for moving a quantity of fluid in an in vitro analyzer, and for verifying the accuracy of the volume of fluid so moved. In one embodiment, the fluid (preferably a liquid) is drawn from a reservoir and transferred to a cuvette or other container. In another, the fluid is drawn from a sample container and transferred to a cuvette or other container. In each embodiment, two pressure transducers are disposed in the fluidic circuit, with no intervening obstruction or flow restricting element therebetween, thereby enabling the more accurate measurement of fluid flow rate and fluid volume.

Preferably, a fluid-bearing conduit is provided with a pump for selectively moving fluid through the conduit in one or both directions, one or more valves for enabling the selective movement of fluid within the conduit, and a controller for controlling and configuring the pump, the valve(s), and for receiving pressure data from the two pressure transducers and for performing various calculations on the received data.

Figure 1:
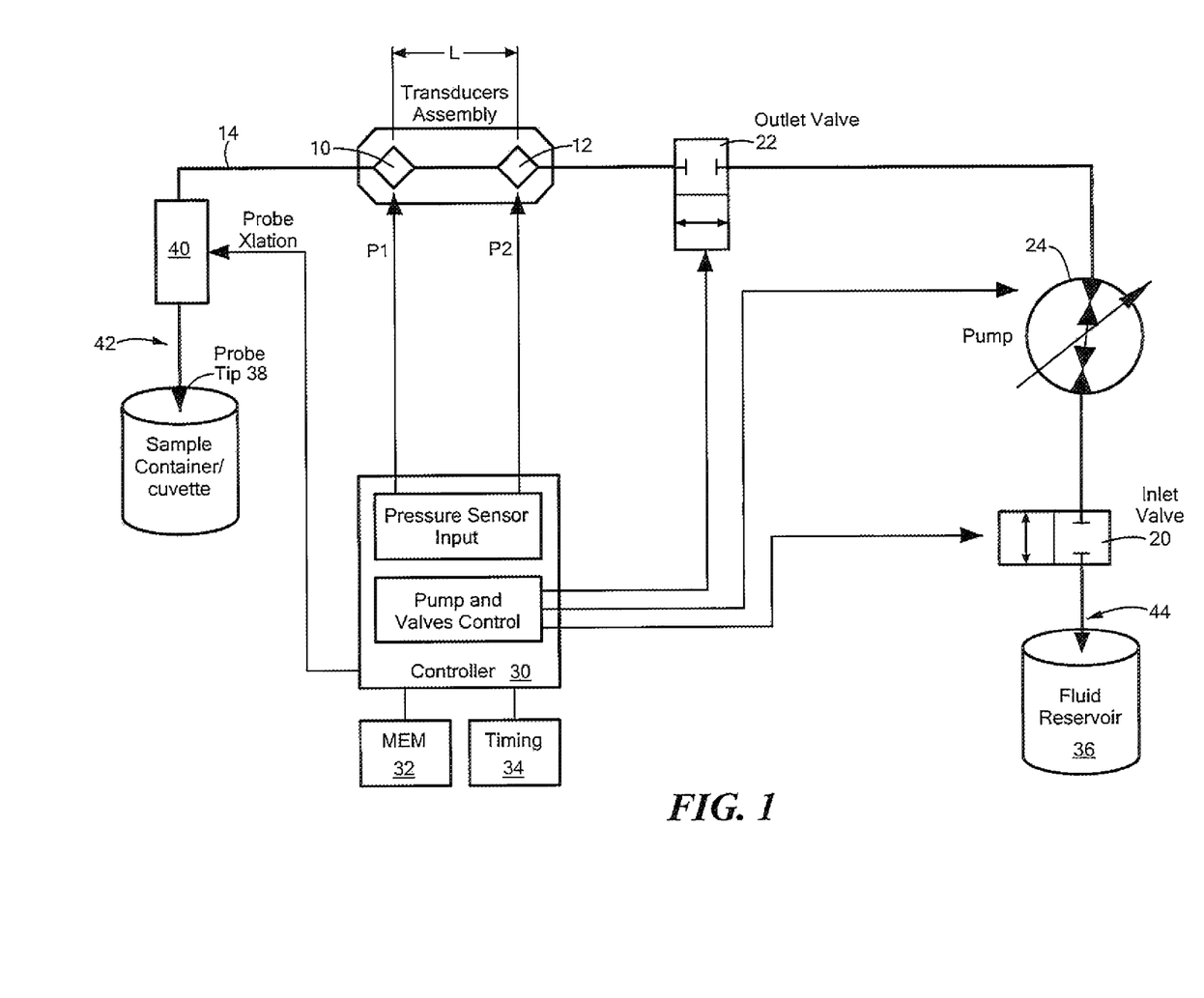
FIG. 1 is a schematic diagram of a first embodiment of a fluid-bearing circuit for an in vitro analyzer according to the present invention.

FIG. 1 illustrates one fluidic circuit configuration in which the presently disclosed concept may be utilized. A first end 44 of the conduit 14 may be disposed in fluidic communication with a reservoir 36. A second end 42 of the conduit may have some form of outlet formed thereon. Alternatively, the second end may be configured to receive a probe tip 38, which may be disposable, depending upon the application. The conduit second end, with or without a probe tip installed, may be stationary and each of a sequence of containers, such as cuvettes, may be selectively positioned beneath the probe tip to receive fluid therefrom. Alternatively, the conduit second end, with or without a probe tip installed, may be positionable in one, two or three axes using a probe translation device 40. Such devices are known in the art and may include screw gears, rack gears, stepper motors, etc., for the purpose of moving the probe tip relative to a fluid container, one or more cuvettes or other containers in a sequence thereof, etc. If the second end is positionable, this enables the probe to be placed into fluidic communication with a source of liquid, such as a sample container, from which liquid is aspirated, and then with a container such as a cuvette for receiving liquid from the conduit second end.

While not depicted in the figures, the fluidic circuit may also be provided with means for detaching a used probe tip and for enabling the installation of a new tip. Such means may include the probe translation device moving the probe tip relative to a tip detachment projection whereby a flange associated with the tip is disposed below the projection. Upward movement of the second end 42 of the conduit causes the probe tip flange to interfere with the projection and to thus become unattached. The conduit second may then be positioned over a vertically oriented supply of probe tips and driven down into this supply in order to engage a new tip. However, these arrangements for tip removal and insertion are not exclusive and other known techniques may be employed in conjunction with the presently disclosed apparatus and method.

A first embodiment of a fluidic circuit is depicted in schematic form in FIG. 1. First and second pressure transducers 10, 12 are shown a known length L apart along the conduit 14. Two valves are shown in this embodiment: an inlet valve 20 and an outlet valve 22. Disposed between the two valves is a pump 24.

For ease of reference, it can be said that the conduit 14 is logically divided into two portions, a proximal portion to the left of the outlet valve 22 and a distal portion to the right of the outlet valve 22. Thus, the probe 38 and two transducers 10, 12 are located along the proximal portion, while the pump 24 and inlet valve 20 are located along the distal portion. Also solely for ease of reference, it can be said that the distal portion is comprised of a first segment and a second segment. The first segment is that portion of the conduit between the outlet valve 22 and the pump 24, while the second segment is that portion of the conduit between the pump 24 and the reservoir 36, containing the inlet valve 20.

The pressure transducers 10, 12, the valves 20, 22 and the pump 24 are all in communication with a controller 30. The controller may be provided as a specially programmed general purpose computer or a custom-configured processing unit such as an Application Specific Integrated Circuit (ASIC). It may be provided as a discrete processing element, or may be implemented by a processor associated with a larger system of which the presently disclosed fluidic circuit forms a part, such as an automated in vitro analyzer. Associated with the controller is data memory 32 such as random access memory (RAM) that may be implemented in a variety of ways, including fixed or removable memory devices, as are known. A timing circuit or clock 34, which may be integral to the processor forming the controller or which may be a discrete circuit element, is also provided for use by the controller.

Regardless of the specific implementation, the controller performs at least the following functions: it selectively receives and stores pressure data from each of the two pressure transducers, storing it preferably along with the time at which the data was generated or received; it issues control signals to the valves in order to individually configure the valves as required; and it issues control signals to the pump to selectively operate the pump to move fluid in one or the other direction within the conduit as desired.

The controller may have standard data ports or other application-specific interfaces for acting as pressure sensor input interfaces. Similarly, the controller may utilize standard input/output (I/O) ports to serve as pump and valve control interfaces, or alternatively may be provided with application-specific interfaces as known to one skilled in the art.

Other optional controller functions include controlling the position of the translatable probe tip via the probe translation device 40. The controller may be in communication with other control devices in an in vitro analyzer whereby the operation of the controller 30 and thus the fluidic circuit is synchronized with other operations of the in vitro analyzer, such as the movement of fluid containers or cuvettes relative to the conduit second end 42.

According to the Poiseuille theory, and specifically the Poiseuille (or Hagen-Poiseuille) Equation, the volume of a homogeneous fluid passing per unit time through a capillary tube is directly proportional to the pressure difference between its ends and to the fourth power of its internal radius (or diameter), and inversely proportional to its length and to the viscosity of the fluid.

Mathematically, the Hagen-Poiseuille Equation is represented by:

$$\Delta P = \frac{128\mu L Q}{\pi d^4}$$

which resolves to:

$$Q = \frac{\Delta P \pi d^4}{128 \mu L}$$

where:
Q is the volumetric flow rate
ΔP is the pressure drop
π is approximately equal to 3.141592654
d is the tube diameter
μ is the dynamic viscosity of the fluid
L is the tube length.

As noted above, the controller is adapted to selectively receive pressure measurement signals from each pressure transducer at regular intervals and to record these measurements in memory. From these stored values, the pressure differential between the two readings ΔP is calculated for each point in time. π is obviously a known value. The tube diameter d (or radius), the dynamic viscosity of the fluid μ, and the length along the conduit between the two transducers L are all predetermined and stored in conjunction with or otherwise accessible to the controller.

Using the Hagen-Poiseuille Equation, the controller calculates a value for the volumetric flow rate Q at each of plural, regularly spaced temporal points. The controller is further adapted to mathematically integrate plural determined values of volumetric flow rate, from across a temporal range, to determine the total volume of fluid that transited through the conduit, past the pressure transducers, during the temporal range. Thus, a highly accurate determination of flow rate and total volume is obtained using the transducer configuration herein described.

Again with respect to FIG. 1, a typical system and method of operation involves aspirating liquid from a container at the second end of the conduit, then dispensing the liquid into another container at the same conduit end. There are many ways such a system can be implemented. For example, the majority of the conduit 14, including the conduit between the two pressure transducers 10, 12, may be filled with an inert liquid such as water. Then, the conduit second end may be placed in fluidic communication with another liquid to be aspirated, such as a patient sample or a reagent, and the pump is selectively operated under controller command in order to aspirate a desired quantity of the liquid. Depending upon the specific nature of the liquid to be aspirated, it may be desirable to aspirate a relatively small quantity of air before aspirating the liquid, such that an air "slug" or buffer separates the water in the conduit system from the aspirated liquid. In another embodiment, there is no need for such an air buffer. Preferably, in this embodiment, water always remains between the two transducers and, for purposes of the Poiseuille Equation, the dynamic viscosity of water is employed.

In order to configure the conduit circuit for operation as just described, the controller opens the inlet valve 20 and the outlet valve 22, then sends a command signal to the pump 24 to begin pumping water (or other desired liquid for filling the conduit) from the reservoir 36 into the conduit 14. Once sufficient liquid has flowed through the conduit, at least so that the liquid has passed both pressure transducers 10, 12, the pump is stopped and the inlet valve in closed. Next, the controller commands the probe translation device 40 to orient the second conduit end 42, with or without a probe tip 38, with respect to a container. An optional air slug is aspirated by operating the pump before placing the conduit end in contact with the liquid in the container. The conduit end is then placed in contact with the liquid, and the pump is operated in order to aspirate a desired amount of liquid. The pump is then stopped and the controller then commands the probe translation device to move the conduit second end with respect to a receiving container such as a cuvette. The pump is then operated in order to dispense a desired quantity of liquid. During at least the aspiration and/or dispense operations, which may include the optional aspiration of an air slug, the controller records pressure data from each of the pressure transducers for use in calculating flow rate and total transferred volume.

Optionally, the controller may then be used to command the probe translation device to position the second conduit end with respect to a waste receptacle or port (not shown), and the pump is operated to dispense any remaining previously aspirated liquid. If necessary, the pump may also be operated in order to dispense a quantity of water (or other inert liquid filling the remainder of the conduit) from the conduit second end, thereby purging the conduit of any residual aspirated liquid. The controller issues commands to the two valves and the pump to accomplish these steps.

As a further optional step, the controller may be adapted to command the conduit second end probe translation device to place the second conduit end in communication with a source of wash liquid, a quantity of which is the aspirated into the conduit and then dispensed into a waste receptacle.

In an alternative embodiment, the conduit is filled with air except for the quantity of liquid that is aspirated into the conduit second end. However, air is more compressible than, for example, water, and so pressure measurements and the resulting flow rate and volume measurements would be less accurate than in a system employing water or other inert liquid. Water also serves to reduce the likelihood of the pressure transducers from being contaminated by the aspirated liquid.

In yet another alternative embodiment employing the fluidic circuit of FIG. 1, the fluid reservoir 36 contains a liquid such as wash, acid reagent, or base reagent, liquids that may need to be dispensed into a plurality of receiving containers. In this case, fluid flow is uni-directional through the circuit. The dynamic viscosity of the respective liquid is utilized by the controller in making flow rate and volume calculations.

Figure 2:
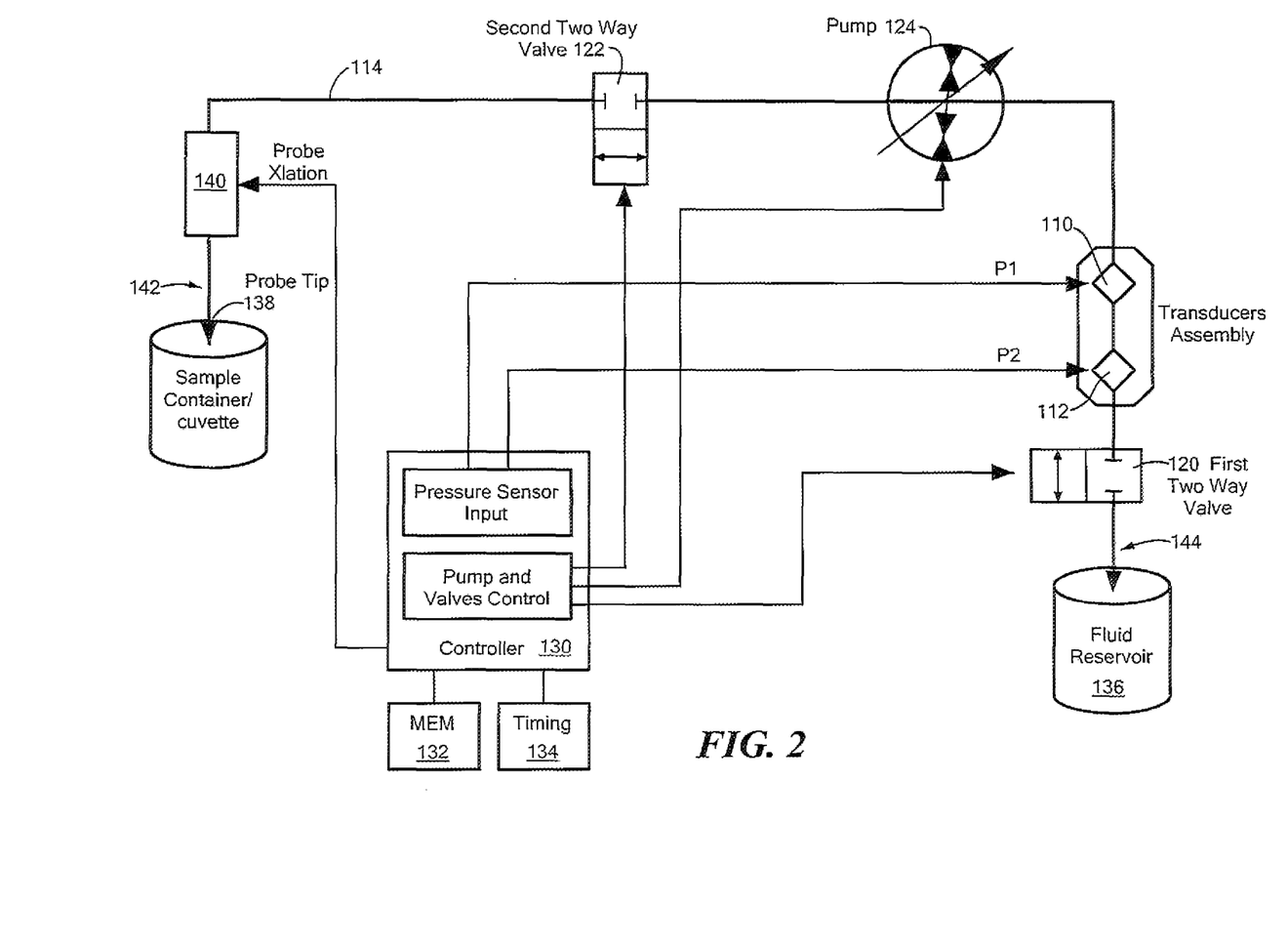
FIG. 2 is a schematic diagram of a second embodiment of a fluid-bearing circuit for an in vitro analyzer according to the present invention.

A second embodiment of a fluidic circuit according to the presently disclosed invention is depicted in FIG. 2. Here, the circuit comprises a conduit 114 logically divided into a proximal portion and a distal portion on opposing sides of a second two-way valve 122. The second conduit end 142 associated with the proximal portion is optionally provided with a probe tip 138, and optionally with a probe translation device 140, similar to that described with respect to FIG. 1.

In the second embodiment illustrated in FIG. 2, a pump 124 is disposed in the distal portion of the conduit 114 and logically separates the distal portion into first and second segments, the first segment being intermediate the second two-way valve 122 and the pump 124, with the second segment being between the pump 124 and the first conduit end 144 in fluidic communication with the contents of a reservoir 136. The two pressure transducers 110, 112 are shown disposed in the second segment of the distal portion of the conduit 114 in FIG. 2, separated by a known or predetermined distance L. There is no other element or restriction in the conduit between the two pressure transducers in this embodiment or in that shown in FIG. 1. Additionally, the conduit 14, 114 in both embodiments is of a consistent, known diameter over the distance L.

A first two-way valve 120 is disposed intermediate one of the two pressure transducers 112 and the conduit first end 144 of the conduit 114 in FIG. 2. A controller 130 with associated memory 132, timing circuit 134, and appropriate pressure sensor input and pump and valve control interfaces, as described above with respect to FIG. 1, is also provided in the embodiment of FIG. 2. The operational capabilities of the controller may be similar to that of the controller 30 of FIG. 1.

Specifically, the controller 130 is adapted to configure the first and second two-way valves 122, 120 and the pump 124 to enable liquid to flow from the reservoir 136 via the first conduit end 144, past the two pressure transducers 110, 112 to the second conduit end 142. A cuvette or other container is disposed beneath the second end 142 for receiving the liquid. At least during the period in which the pump is operating to aspirate liquid from the reservoir, the controller is adapted to receive pressure data from the transducers 110, 112, record it in memory 132 along with or indexed according to time data from the timing circuit 134, determine the pressure differential between the two sets of pressure data indexed according to time, calculate the volumetric flow rate over time, and calculate the total volume dispensed during a given time interval by integrating the volumetric flow rate for that interval.

In one implementation of the embodiment of FIG. 2, the pump 124 is provided as a syringe pump having a piston chamber in communication with the conduit. Operation of the syringe pump must be done in coordination with the proper configuration of the two-way valve 120, 122, all under the control of the controller 130. For example, in order to aspirate liquid from the fluid reservoir 136, the first two-way valve 120 is opened, the second two-way valve 122 is closed, and the pump 124 piston is withdrawn, creating a vacuum that aspirates liquid from the reservoir 136 via the conduit first end 144 that is disposed in fluidic communication with the contents of the reservoir. The aspirated liquid must transit that portion of the conduit in which are disposed the two pressure transducers 110, 112. During aspiration, the pressure data from the transducers are collected by the controller for use in calculating volumetric flow rate and total volume aspirated, as described in the foregoing.

Once so aspirated, the first two-way valve 120 is closed, the second two-way valve 122 is opened, and the pump 124 piston is driven forward, thereby driving liquid from the syringe pump into the conduit 114 towards the second conduit end 142 and a container disposed therebeneath.

Figure 3:
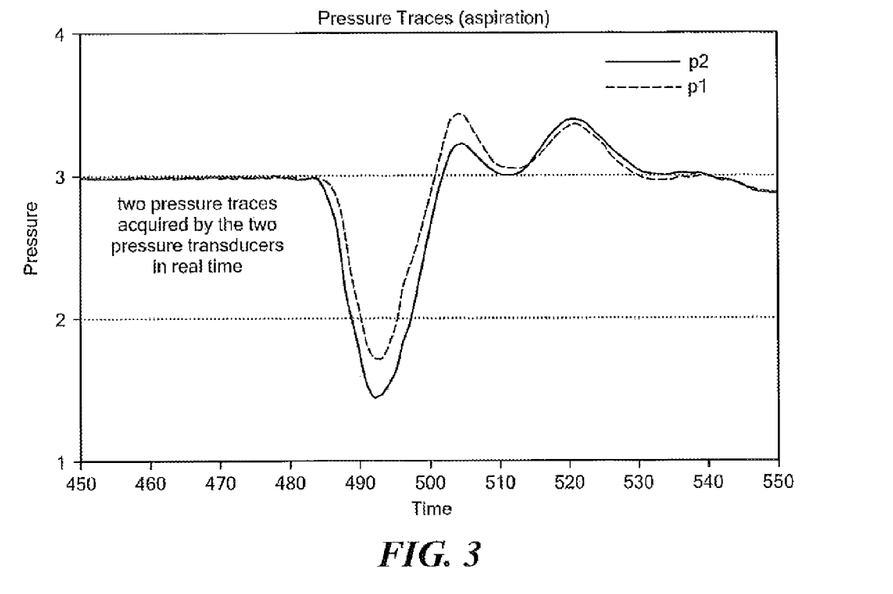
FIG. 3 is a graph illustrating pressure versus time for each of two pressure transducers employable in the embodiment of FIG. 1.

FIG. 3 is an illustration of pressure traces formed from data provided by the two pressure transducers 10, 12 of FIG. 1 during an initial aspiration step. Specifically, once the controller 30 commands the pump 24 to aspirate a quantity of fluid from the container disposed in fluidic communication with the second conduit end 42, which may or may not be provided with a disposable probe tip 38, pressure within the conduit in general and in the area of the pressure transducers in particular will fall and a pressure differential between the pressure transducers will form. This is evident in the pressure plots in FIG. 3 approximately between the times of 480 and 500. During this period, the pressure associated with the upstream pressure transducer 12 is labeled as P2 in the figure, while the pressure associated with the downstream pressure transducer 10 is labeled as P1 in FIG. 3.

After aspiration, there may be a "rebound" effect in the conduit pressure as the pump operation is discontinued. This can be seen in FIG. 3 between the times of 500 and 530. Note, however, that the pressure differential quickly resolves to close to zero once the pump operation is ceased.

Figure 4:
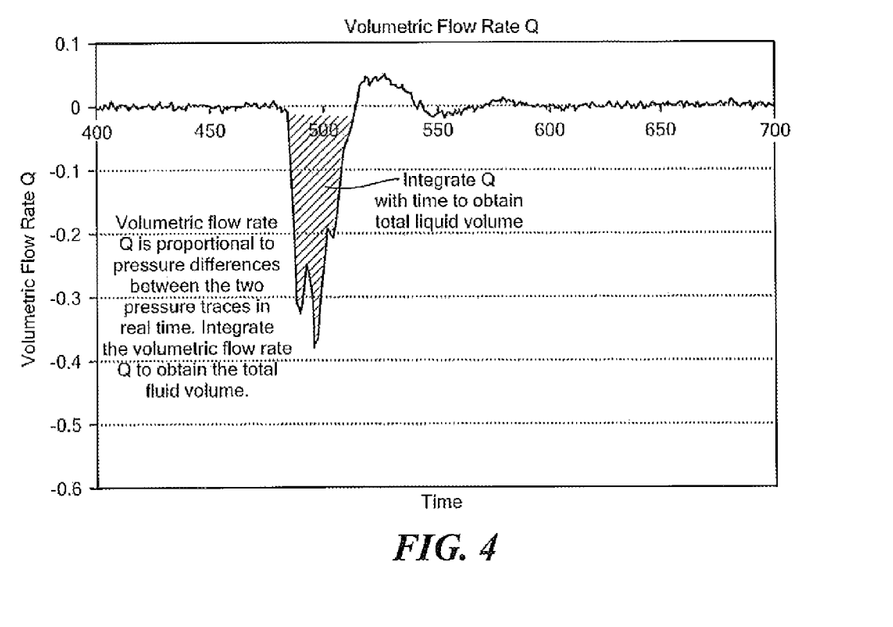
FIG. 4 is a graph illustrating volumetric flow rate versus time calculated from the pressure versus time values of FIG. 3.

As noted in the foregoing, the controller 30 performs several calculations that ultimately depend upon the pressure differences shown in FIG. 3. First, it calculates the pressure differential versus time. Second, it uses the calculated pressure differential along with other known factors (discussed above) to calculate the volumetric flow rate versus time. FIG. 4 is a graph of the volumetric flow rate versus time calculated from the pressure values shown in FIG. 3. Finally, the controller integrates the volumetric flow rate over a given time period to determine a volume of liquid that passed through the conduit over the time period used in the integration.

The controller may be provided with a range of normal or expected values for flow rate and/or total volume and may compare the determined values against the thresholds. Failure to aspirate a correct volume may indicate a leak or occlusion in the conduit. Detection of such a failure may cause the controller to set an alarm state, whereby an indication thereof is recorded in association with the recorded pressure, flow rate or volume data. A notification may be provided to a user through one of various means, including an aural or visual indication. The controller may also provide an error indication to another controller associated with the in vitro analyzer of which the respective fluid conduit circuit may form a part.

In addition to the controller comparing the calculated flow rate and/or volume to predetermined threshold values, it may in a further embodiment also compare the absolute pressure values from each transducer with a range of expected and/or allowed values. Thus, an unexpectedly high pressure value during either an aspiration or dispense operation could indicate a conduit occlusion. The controller would then carry out some form of alarm notification, as described above.

Figure 5:
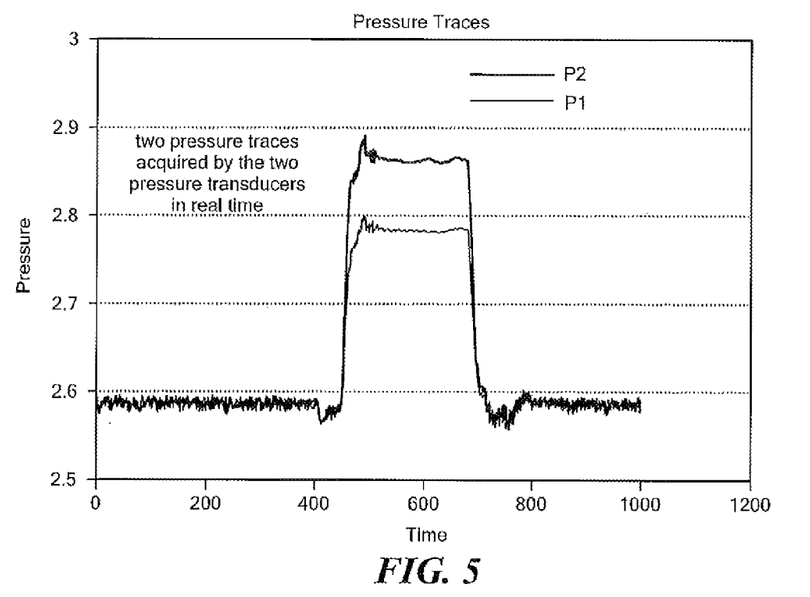
FIG. 5 is a graph illustrating pressure versus time for each of two pressure transducers employable in the embodiment of FIG. 1.

FIG. 5 provides pressure traces that would typically result from the transducers 10, 12 of FIG. 1 during a dispense operation. At approximately time 400, the controller 30 commands the pump 24 to dispense at least a portion of the previously aspirated liquid. The pressure in the conduit 14 in the region of the pressure transducers quickly rises. However, note that the pressure in the upstream pressure transducer P2 12 raises higher than that of the downstream pressure transducer P1 10. Just before time 700, the controller commands the pump to cease the dispense cycle and the conduit pressure at both transducers returns to a stasis level.

Figure 6:
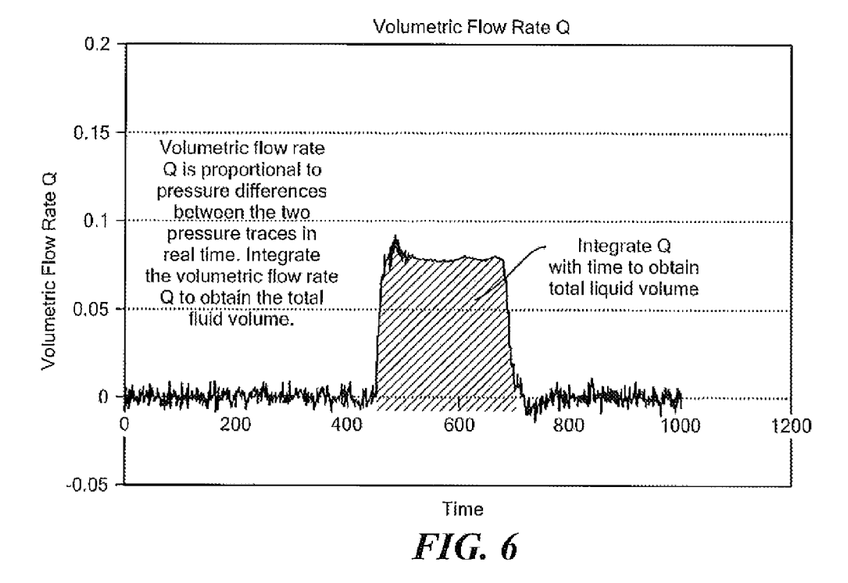
FIG. 6 is a graph illustrating volumetric flow rate versus time calculated from the pressure versus time values of FIG. 5.

Once again, the controller calculates the pressure differential from the pressure traces shown in FIG. 5, then calculates the volumetric flow rate Q using the Hagen-Poiseuille Equation, described above. The resulting flow rate is graphed in FIG. 6. As described in the foregoing, the controller may be provided with optimal expected values or a range of threshold values for determining whether the actual flow rates and volume dispensed is as expected. If not, an alarm condition is established and appropriate steps are taken to document the condition and to alert a larger system controller and/or a user.

Figure 7:
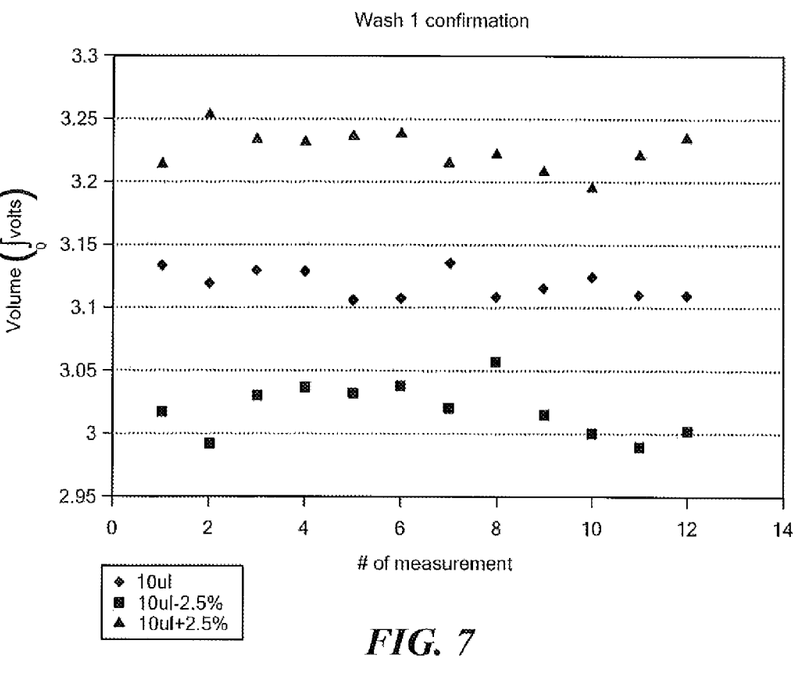
FIG. 7 is a graph illustrating the ability of the presently disclosed invention to differentiate +/−2.5% in total fluid volume.

FIG. 7 illustrates the ability of the present invention to differentiate between a target volume value and +/−2.5% of that volume value. Specifically, a circuit configuration such as shown in FIG. 1 was employed. The liquid used in the test was water—therefore, the dynamic viscosity $\mu$ was 1 cP. The conduit used had an inner diameter of 0.79 mm. The pressure transducers were separated by 50 mm along the conduit. Pressure measurements were made using the two pressure transducers as 10 ul of water was dispensed twelve times. In addition, 10 ul+2.5% (i.e., 10.25 ul) was dispensed twelve times. Finally, 10 ul−2.5% (i.e., 9.75 ul) was dispensed twelve times. For each dispense, volume was calculated by integrating the pressure differential with respect to time. For purposes of this test, flow rate was not at issue and thus the volumetric flow rate was not calculated first. However, since volumetric flow rate is proportional to the pressure differential, volume may be calculated in a similar fashion, which is to say, by integrating pressure differential over time.

In the test case, pressure readings were recording in volts. Thus, pressure differential was also a voltage value. After integration, then, the volume data is given in volts integrated with time. Ideally, these values would be converted to micro-liters by multiplying each by a conversion factor. Gravimetric measurements were simultaneously performed in order to verify the accuracy of the test results. The results suggest that the presently disclosed systems and methods may accurately measure a total volume of liquid moved through a conduit during a given period of time.

Many changes in the details, materials, and arrangement of parts and steps, herein described and illustrated, can be made by those skilled in the art in light of teachings contained hereinabove. Accordingly, it will be understood that the following claims are not to be limited to the embodiments disclosed herein and can include practices other than those specifically described, and are to be interpreted as broadly as allowed under the law.

What is claimed is:

1. A fluid-bearing circuit for conveying a fluid from a reservoir to a sample container in an in vitro analyzer comprising:

a fluid-bearing conduit;

two pressure sensors disposed a predetermined distance apart along the conduit, each for measuring pressure within the conduit proximate the respective pressure sensor and for generating a pressure signal indicative thereof;

a probe having a probe tip;

a first valve disposed within the conduit for selectively controlling fluid flow through the conduit;

a pump disposed in association with the conduit for selectively pumping fluid in at least one direction within the conduit; and a controller in communication with the two pressure sensors, the first valve, and the pump, wherein the conduit is of substantially uniform cross-section and is unobstructed between the two pressure sensors, the conduit defines a fluid path and includes a proximal portion and a distal portion, the proximal portion of the fluid path extends from the probe to the first valve, the distal portion of the fluid path extends from the first valve to a reservoir and includes a first segment and a second segment, the first valve is disposed between the proximal portion and the distal portion for selectively controlling fluid flow therebetween, the pump is disposed between the first segment and the second segment of the distal portion, the controller receives the respective pressure signal from each of the two pressure sensors, the controller selectively controls the first valve to thereby control the fluid flow through the conduit, the controller selectively controls the pump to thereby selectively pump the fluid in at least one direction within the conduit, and the controller is configured to calculate the difference in the measured pressures and, from the difference, to calculate the volumetric flow rate of the fluid through the fluid-bearing conduit between the two pressure sensors.

2. The fluid-bearing circuit of claim 1, wherein the two pressure sensors are disposed in the proximal portion.

3. The fluid-bearing circuit of claim 2, further comprising a second valve disposed within the second segment of the distal portion and wherein the distal portion is in fluidic communication with a fluid reservoir.

4. The fluid-bearing circuit of claim 3, wherein the controller is operative to selectively open the fluid path through the first valve and the second valve and for selectively operating the pump to convey fluid from the reservoir, through the second valve, the pump, and the first valve, past the two pressure sensors, and through an open end of the proximal portion to the probe.

5. The fluid-bearing circuit of claim 4, wherein the probe tip comprises a removable probe tip.

6. The fluid-bearing circuit of claim 3, wherein the pump is a syringe pump and the conduit is in fluidic communication with a syringe pump piston chamber, and wherein the second valve is opened while the first valve is closed to enable the aspiration of liquid from the reservoir by the withdrawal of the syringe pump piston.

7. The fluid-bearing circuit of claim 3, wherein the pump is a syringe pump and the conduit is in fluidic communication with a syringe pump piston chamber, and wherein the first valve is opened while the second valve is closed to enable the dispensation of liquid from the syringe pump piston chamber by the insertion of the syringe pump piston.

8. The fluid-bearing circuit of claim 1, wherein the two pressure sensors are disposed in the second segment of the distal portion.

9. The fluid-bearing circuit of claim 1, wherein the controller is configured to calculate the volumetric flow rate through the conduit proximate the pressure sensors on the basis of a known relationship between a calculated difference in the measured pressures between the two pressure sensors, the distance along the fluid-bearing conduit separating the two pressure sensors, a predetermined dynamic viscosity of the fluid flowing through the fluid-bearing conduit, and a predetermined radius or diameter of the fluid-bearing conduit intermediate the two pressure sensors.

10. The fluid-bearing circuit of claim 9, wherein the known relationship is the Hagen-Poiseuille Equation.

11. The fluid-bearing circuit of claim 1, further comprising translating apparatus associated with the end of the fluid-bearing conduit for translating an end of the fluid-bearing conduit at least in a horizontal or vertical direction, the translating apparatus being in communication with and under the control of the controller.

12. The fluid-bearing circuit of claim 11, wherein the translating apparatus is for moving the end with respect to at least one of a fluid reservoir and a cuvette.

13. The fluid-bearing circuit of claim 1, wherein the controller is for selectively opening the first valve and controlling the pump to move the fluid:
   in a first direction within the fluid-bearing conduit in order to aspirate the fluid through an end of the fluid-bearing conduit and past the two pressure sensors; and
   in an opposite, second direction within the fluid-bearing conduit, past the two pressure sensors, to dispense the fluid through the end.

14. The fluid-bearing circuit of claim 1, wherein the fluid-bearing conduit has a circular cross-section.

15. The fluid-bearing circuit of claim 1, further comprising a memory in association with the controller, wherein the controller is further for recording pressure measurements from each of the two pressure sensors at regular temporal intervals.

16. The fluid-bearing circuit of claim 15, wherein the controller is further for determining the value of volumetric flow rate at each of plural temporal intervals from the respective recorded pressure measurements and for determining a fluid volume that moved between the two pressure sensors during a time period by mathematically integrating volumetric flow rate values over the time period.

17. The fluid-bearing circuit of claim 16, wherein the controller is further for comparing the determined fluid volume to a predetermined threshold value to determine whether a desired fluid volume moved within the conduit proximate the pressure sensors and, if not, to identify an error condition.

* * * * *